United States Patent [19]
Brown

[11] 3,847,419
[45] Nov. 12, 1974

[54] SEALED TUBE CONNECTORS

[75] Inventor: Robert S. Brown, Tecumseh, Mich.

[73] Assignee: Standard Steel Products Corporation, Tecumseh, Mich.

[22] Filed: Apr. 5, 1973

[21] Appl. No.: 348,054

[52] U.S. Cl................. 285/330, 285/331, 285/382, 285/417, 285/422, 403/284, 403/300
[51] Int. Cl............................................ F16l 19/00
[58] Field of Search ........... 285/331, 399, 417, 173, 285/199, 382, 369, 373, 419, 382.1, 382.2, 330, 424, 336, 177, 422; 403/284, 300

[56] References Cited
UNITED STATES PATENTS

| 368,508 | 8/1887 | Bishop | 285/173 |
|---|---|---|---|
| 1,977,432 | 10/1934 | Dick | 285/173 |
| 2,455,544 | 12/1948 | Yonkers | 285/330 X |
| 3,109,215 | 11/1963 | Brown | 285/382.2 X |
| 3,149,860 | 9/1964 | Hallesy | 285/382 X |
| 3,429,587 | 2/1969 | Kish | 285/331 X |
| 3,596,939 | 8/1971 | Gibson | 285/369 X |

Primary Examiner—Jordan Franklin
Assistant Examiner—Moshe I. Cohen

[57] ABSTRACT

Means for providing a sealed connection between the ends of tubular members which are made of material such as stainless steel which is too rigid to readily permit deforming one tube against the other by clamps as is conventionally done with soft steel tubes. A sleeve member of deformable or ductile material such as copper, aluminum or plastic is located around adjacent ends of two tubular members which preferably may be attached together by telescoping the end of one tube into an enlarged end portion of the other tube. Adjustable 360° contact clamps are then tightened around the ends of the sleeve member to deform it against the rigid tubular members thereby effecting a seal about the connection.

4 Claims, 8 Drawing Figures

SEALED TUBE CONNECTORS

This invention relates to means for forming a sealed connection between the ends of tubular members which are made of a material too rigid to permit deforming one member against the other by conventional clamping means.

Previously, connections between tubular members made of soft steel which are used in vehicle exhaust systems have been by clamp means alone. The end of one of the tubular members is first telescoped into an enlarged end portion of the other tubular member and then a clamp is positioned around the overlapping portion. When the clamp is tightened, the outer tube is deformed against the inner tube to effect a good seal. This method works to join tubular members made from soft steel but has been found to provide insufficient sealing when harder steel tubes are utilized.

With the coming of emission control devices for internal combustion engines such as the use of catalytic converters or thermal reactors in an exhaust system, exhaust tubes require utilization of more rigid materials such as a higher alloy steel or stainless steel. Conventional clamping means have been found to be insufficient to seal one portion of a hard steel tube member against another tube to effect a leakfree connection. Welding the joint between the tube members would provide a good seal but also would hinder convenient servicing of the exhaust system.

The present invention provides a means for connecting the ends of tubular members which are made from a material too rigid to readily permit deforming one tube against the other by clamps. The ends of the tubular members may be formed to provide a telescoping overlap with one end encircling another end or the ends may be simply butted against one another. A tubular sleeve is provided around the adjacent end portions of the rigid tubes and is made from a relatively soft, ductile material such as copper, aluminum or some plastics. Clamps are positioned around the ends of the sleeve and tightened to deform it against the outer surfaces of the rigid tubes thus effecting a leakproof seal about the connection.

One embodiment of the invention provides positive means to resist twisting forces and to prevent relative rotation between the tube members in addition to the torque resisting forces provided by the clamping of the sleeve on the tube. The end of one tube member is formed with an axially directed groove or channel therein. The end of the other tube member has a portion struck-out or otherwise deformed from its generally circular surface to provide a tab or ridge adapted to coact with the corresponding channel or groove in the other tube when the ends are joined together in telescoping fashion. This coaction between tab and groove prevents relative rotation between the tubes. The previously described means for sealing a joint between ends of rigid tubular members is particularly well adapted for sealing this anti-rotation connection. The sleeve member completely surrounds the overlapping joint portion of the rigid tubes including the tab and groove portions. The deformation of the sleeve against the tubes by clamps seals the joint as well as the connection between tab and groove.

Therefore, an object of the present invention is to provide an effective sealed joint or connection between tubular members which are made of material too rigid to permit deforming an outer end of one tube against the other tube by clamps.

A still further object of the present invention is to provide a sealed joint or connection between ends of tubular members utilizing a ductile sleeve which encircles one end of each of the tubular members and is pressed inwardly at both its ends against the tubular members by clamps to form a leakfree seal.

A still further object of the present invention is to provide a sealed joint or connection between ends of tubular members which is easily disassembled by simply loosening clamps and removing a soft sleeve member to permit servicing and replacement of one or both of the tubular members.

A still further object of the present invention is to provide a sealed joint or connection between ends of tubular members which includes positive means to resist torque forces and prevent relative rotation between the tubular members.

Further objects and advantages of the present invention will be more readily apparent from the following detailed description, reference being had to the accompanying drawings in which preferred embodiments of the invention are illustrated.

IN THE DRAWINGS

Figure 1:
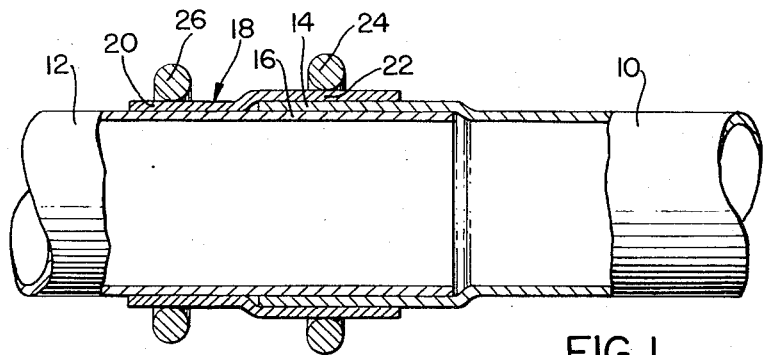
FIG. 1 is a partially sectioned view of a sealed telescoping-type connection between rigid tube members.

In FIG. 1 of the drawings, one embodiment of the present invention is illustrated including first and second tubular members 10 and 12. The end 14 of tube member 10 is enlarged in diameter to provide a sufficient inside diameter to accept end 16 of tube member 12 in telescoping and overlapping engagement.

Tubes 10 and 12 may be portions of an engine exhaust system. As previously indicated, relatively hard and rigid materials such as stainless steel or high alloy steel may be used in vehicle exhaust systems having emission control or anti-pollution devices such as catalytic converters or thermal reactors. One reason for the use of high alloy or stainless steels in their anti-corrosive characteristics particularly when exhaust temperatures are increased as is expected. The use of rigid material for tubes 10 and 12 precludes the use of clamps around the overlapping portions 14 of tube 10 in the conventional manner. These materials are sufficiently hard or rigid as compared to soft steel to prevent clamps placed around the overlapping portion 14 of tube 10 to deform the outer tube against the inner tube to provide a good seal. Consequently, exhaust gas leakage may result thus decreasing the desirable emission effect of control equipment.

The present invention provides a simple and highly effective means for forming a sealed connection between the ends of tube members which are too rigid to be readily deformed against one another by clamps. A generally cylindrical sleeve 18 is shown in FIG. 1 and has an end portion 20 adapted to encircle tube 12 and an enlarged diameter end portion 22 adapted to encircle end 14 of tube 10. Actually, the inner diameter of end 20 is slightly greater than the diameter of tube 12 and thus the sleeve 18 may be readily inserted over the tube 12. After the portion 14 of tube 10 is telescoped over end 16 of tube 12, the end portion 22 of sleeve 18 is slipped over the overlapping portion. Two adjustable clamping members 24 and 26 are then positioned adjacent either end of sleeve 18 and subsequently tightened to deform the sleeve 18 against the outer surfaces of tubes 10 and 12 to perfect the seal.

The sleeve 18 is made from material such as copper, brass, aluminum, lead or plastic which is relatively soft and ductile to permit deformation of the sleeve 18 against the outer surfaces of the tubes 10 and 12 for sealing. The table of materials shown below shows the approximate hardness of various materials considered satisfactory for sleeve 18. Also, a soft steel is listed which is of the type which may be presently used for exhaust tubing. Next, a high carbon steel and a stainless steel are listed. It should be noted that the hardness value indicates the relative degree of rigidity of this material and hence the degree of force necessary to deform a tubular member of such material.

| Material | Approximate Hardness (BHN) Range |
| --- | --- |
| Copper (DHP) | 70 |
| Cartridge Brass Tube | |
| (.025 mm anneal) | 70 |
| (Hard Drawn 35%) | 150 |
| 1060 Aluminum | 19–35 |
| Lead | 3.2–4.5 |
| 1008 (Low Carbon) Steel | 86–95 |
| 4140 (High Carbon) Steel | 300–650 |
| 410 Stainless Steel (quenched) | 400 |

Figure 2:
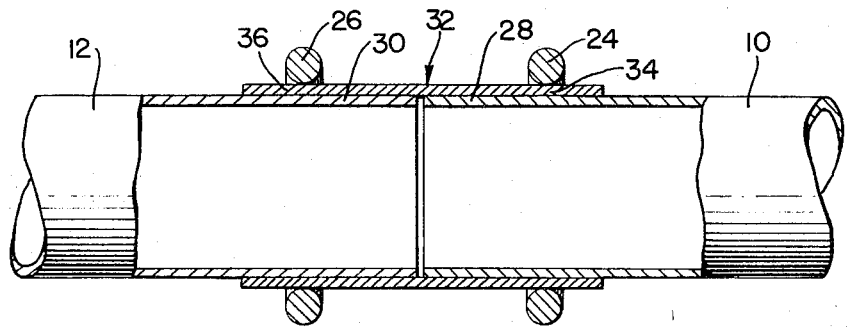
FIG. 2 is a partially sectioned view of a sealed butt-type connection between rigid tubular members.

In FIG. 2 of the drawings, another embodiment of the invention is shown. Unlike the telescoping-type connection shown in FIG. 1, the ends 28 and 30 of tubes 10 and 12 have the same inner and outer diameters and the tubes are simply aligned. The ends are in abutting engagement or nearly so. A straight sleeve 32 having end portions 34 and 36 with equal diameters surrounds the ends 28 and 30. Clamps 24 and 26 encircle the ends of sleeve 32. When the adjustable clamps 24 and 26 are tightened, the relatively soft and ductile sleeve 32 is pressed against the tubes 10 and 12 to effect a seal. The rigidity of sleeve 32 and the nearness of ends 28 and 30 provide sufficient strength for many applications although the telescoping connection is more rigid.

Figure 3:
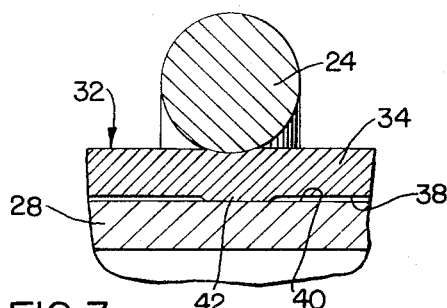
FIG. 3 is a fragmentary and enlarged sectional view of the sealing contact provided in FIGS. 1 and 2.

The seal formed between the sleeve and tubes is best shown in FIG. 3 which is an enlarged and fragmentary sectioned view. Although not visible in FIGS. 1 and 2, sleeve members 18 and 32 are formed with a slightly larger inner diameter 38 than the outer diameter 40 of the tubes. This permits the sleeve 32 to be easily slipped over the ends of the tubes. When the clamps 24 are tightened, the inner portion 42 of the sleeve member is deformed against the rigid tubes 10 and 12. This seals exhaust gases within the connection.

Figure 4:
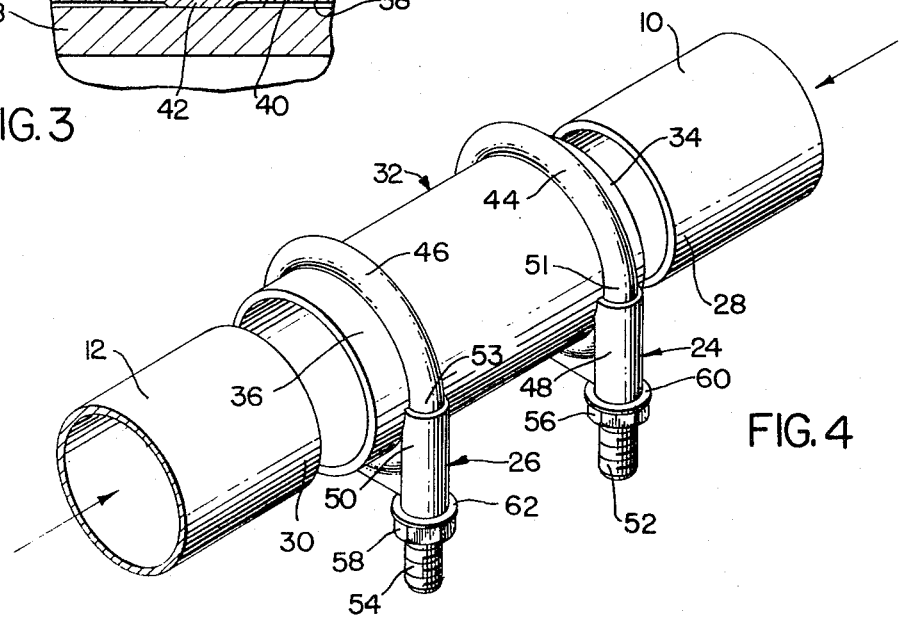
FIG. 4 is a perspective view of the subject seated joint or connection showing a convenient means of assembly utilizing a sleeve and clamp subassembly.

The clamps illustrated in the embodiments shown in FIGS. 1 and 2 are better shown in FIG. 4 and include encircling portions 44 and 46 which are adapted to surround the sleeve member 32 and provide a compressive force on it as the clamp is tightened. First ends of the encircling portions 44, 46 are attached to base portions 48 and 50. The other ends 51, 53 of the portion 44, 46 project tangentially from the curved portions and are threaded as indicated at 52 and 54 to accept threaded fastening means in the form of nuts 56 and 58. When the nuts 56 and 58 are rotated they move against the base portions 48 and 50 to cause the portions 44, 46 to be reduced in diameter and to squeeze sleeve 32 against the tubes 10 and 12.

Washers 60 and 62 are utilized between nuts 56, 58 and bases 48, 50.

The particular type clamp illustrated in the drawings and described above is preferred and is more particularly described in U.S. Pat. No. 3,109,215, which issued Nov. 5, 1963 to Brown who is also the inventor of the subject invention. This clamp is desirable for use in the subject invention because it contacts and applies compressive forces on substantially the entire circumference of the sleeve member. Since the sleeve is made from a ductile material, it is readily distorted against the outer surface of the tubes 10 and 12. Equally as well it is more subject to localized forces than less ductile material and may not seal at all locations unless there is a continuous compressive force around its entire circumference. Other clamp designs providing substantially 360° contact could also be utilized.

FIG. 4 shows a desirable method or manner of assembling the subject sealed joint of the types shown in FIGS. 1 or 2. A subassembly consisting of sleeve 32 has clamps 24 and 26 preassembled on the ends of the sleeve 32. Clamps 24 and 26 are not tightened more than needed to hold them in place. The ends 28, 30 of tubes 10, 12 are then inserted in either end of sleeve 32 until they meet if a butt joint is desired or until the ends overlap, as in FIG. 1, if a telescope-type joint is desired. FIG. 4 shows a preassembly view of a butt-type joint and the parts are numbered to correspond to FIG. 2. After insertion of the tube ends the clamps 24, 26 are tightened to seal the sleeve 32 at both ends against the tubes 10, 12.

Figure 5:
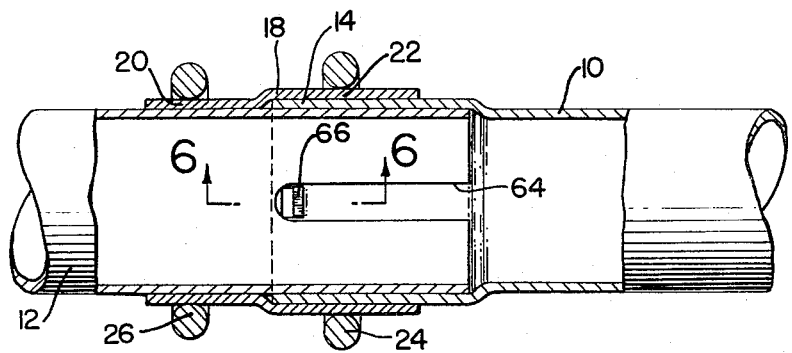
FIG. 5 is a partially sectioned view of a sealed telescoping-type connection between rigid tube members with positive means for resisting torque forces between the tubes to prevent relative rotation therebetween.
Figure 6:
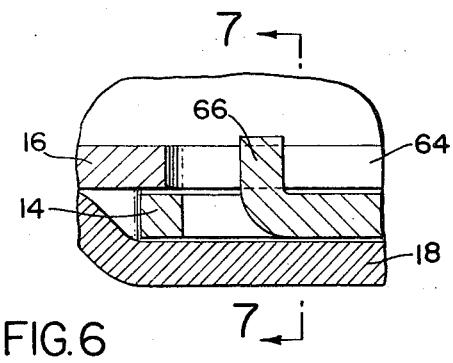
FIG. 6 is an enlarged sectioned view taken along section lines 6—6 in FIG. 5 and looking in the direction of the arrows.
Figure 7:
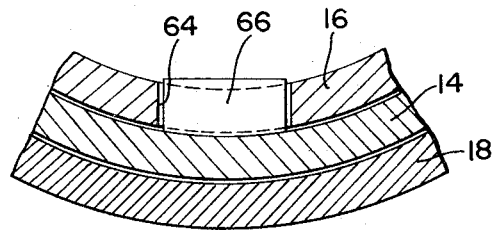
FIG. 7 is a sectioned view of the connection taken along section line 7—7 in FIG. 6 and looking in the direction of the arrows.

The embodiment shown in FIG. 5 is similar to FIG. 1 but includes means to prevent relative rotation between tubes 10 and 12. Portions in FIG. 5 which are the same as the portions in FIG. 1 are numbered alike. The enlarged end portion 14 of tube 10 is adapted to encircle and overlap the end 16 of tube 12 as in FIG. 1. Sleeve 18 with end portions 20 and 22 encircles the tubes 10 and 12. Clamps 24 and 26 encircle the ends of the sleeve 18. To prevent relative rotation or radial shifting of tubes 10 and 12, an axially directed groove or channel 64 is formed in the end 16 of tube 12 and a corresponding tab or ridge 66 is formed in the end portion 14 of tube 10. Detail views in FIGS. 6 and 7 more clearly illustrate the anti-rotation portions 64, 66. Although a particular groove and tab are illustrated, many forms are contemplated. The end 22 of sleeve 18 is extended past the tab portion 66 and is compressed against tube 10 to provide sealing contact between the sleeve 18 and the tube 10 outboard from the tab portion. Likewise, the other end 20 of sleeve 18 is compressed against tube 12 at a location outboard and on the opposite side of the joint portion 14 to enclose the connection including the anti-rotation means 64, 66.

Figure 8:
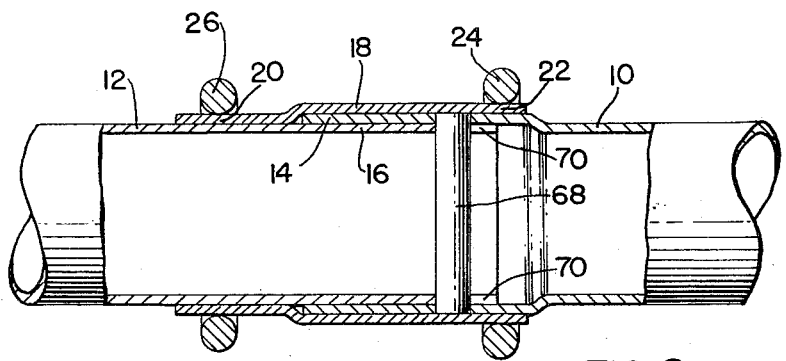
FIG. 8 is a partially sectioned view similar to FIG. 5 of another connection means to form rotation preventing means.

FIG. 8 illustrates another embodiment of the anti-rotation means. Like the embodiments shown in FIGS. 1 and 5, it shows a telescoping type joint. However, a pin means 68 extends across portion 16 which is adapted to be contacted by slots or cut-outs 70 in the end portion 16 to prevent rotation. The surrounding sleeve 18 prevents a movement of pin 68 in a radial direction. Likewise, pin means 70 could be replaced by struck-in portions of tube 10.

Although the illustrated embodiments are preferred, other embodiments may be adapted which would still fall within the scope of the invention as claimed hereafter.

What is claimed is:

1. A sealed connection for fluid transmitting exhaust tube members comprising:

aligned rigid tubular members one having an enlarged diameter end portion slid over the end of the other tubular member in telescoping engagement;

said rigid tubular members made of metallic material having a sufficiently great hardness to preclude forming a connection therebetween by deforming said enlarged end against the inner end by clamps;

a tubular sleeve member positioned around the enlarged end of said one rigid tubular member and around the adjacent portion of the other rigid tubular member and having sufficiently large end openings permitting sliding engagement around the ends of said rigid tubular members during assembly;

adjustable clamp means positioned near both ends of said sleeve member and having encircling portions therearound producing an even compressive force on the end portions of said sleeve member against said rigid tubular members which acts on the entire 360° circumference of said sleeve member;

said sleeve member made of a soft and ductile metallic material having a Brinell hardness less than about 150 and said sleeve portions underlying said clamp means being deformed inwardly by said compressive force producing a line seal contact between said sleeve and said rigid tubular member on either side of said adjacent tube end portions thereby sealing the fluid within said tubes.

2. The tube connection of claim 1 in which positive means are provided between said enlarged diameter end portion of one exhaust tube member and the end of the other exhaust tube member preventing relative rotation therebetween; said positive means covered by said encircling sleeve member preventing fluid leakage thereby.

3. The tube connection of claim 2 in which said positive means include a struck-out tab member in one tube end and a corresponding groove portion in the other tube end which are operably engaged to prevent relative rotation.

4. A sealed connection for fluid transmitting exhaust members comprising; aligned rigid tubular members having end portions; said tubular members made of metallic material having sufficiently great hardness to preclude forming a connection therebetween by deforming the tubular members; a tubular metallic sleeve member positioned around the ends of said rigid tubular members and having sufficiently large end openings to permit sliding engagement around the ends of said rigid tubular members during assembly, adjustable clamp means positioned around both ends of said sleeve member producing an even compressive force on the end portions of said sleeve member against said rigid tubular members about the 360° circumference of said sleeve member; said adjustable clamp means including a rigid encircling portion about each end of said tubular sleeve member, a base portion operably connected to one end of said encircling portion providing a line contact between said clamp means and the end of said tubular sleeve member; threaded fastener means operably engaging a similarly threaded portion on said encircling portion causing said encircling portion to radially constrict said sleeve member against said rigid tubular members as said threaded fastener is moved toward said base portion; said sleeve member being made of a soft and ductile metallic material having a Brinell hardness less than about 150 whereby said sleeve portion directly underlying said clamp means is deformed inwardly by said compressive force, producing a line seal contact between said sleeve and said rigid tubular member, thereby sealing the fluid within said tubes.

* * * * *